United States Patent
Haag et al.

(10) Patent No.: US 12,332,147 B2
(45) Date of Patent: Jun. 17, 2025

(54) METHOD AND APPARATUS FOR CHECKING THE TIGHTNESS OF A CLOSURE

(71) Applicant: Groninger & Co. GmbH, Crailsheim (DE)

(72) Inventors: Manfred Haag, Crailsheim (DE); Lars Michael, Ilshofen (DE)

(73) Assignee: GRONINGER & CO. GMBH, Crailsheim (DE)

( * ) Notice: Subject to any disclaimer, the term of this patent is extended or adjusted under 35 U.S.C. 154(b) by 237 days.

(21) Appl. No.: 18/090,769

(22) Filed: Dec. 29, 2022

(65) Prior Publication Data
US 2023/0138697 A1     May 4, 2023

Related U.S. Application Data

(63) Continuation of application No. PCT/EP2021/068541, filed on Jul. 5, 2021.

(30) Foreign Application Priority Data

Jul. 6, 2020   (DE) .................... 10 2020 117 790.9

(51) Int. Cl.
    *G01M 3/36*   (2006.01)
(52) U.S. Cl.
    CPC .................................... *G01M 3/36* (2013.01)
(58) Field of Classification Search
    CPC ...... G01M 3/36; B07C 5/3404; B65B 7/2821; B65B 7/285; B65B 57/04
    See application file for complete search history.

(56) References Cited

U.S. PATENT DOCUMENTS 4,315,427 A     2/1982   Leiter et al.
4,511,044 A *   4/1985   Connor .................. G01M 3/00
                                                    702/43

(Continued)

FOREIGN PATENT DOCUMENTS

DE       19614475 A1    10/1997
DE    102005023067 A1   12/2005

(Continued)

OTHER PUBLICATIONS

Office Action issued by the German Patent Office for application DE 10 2020 117 790.9 on Mar. 25, 2021.

(Continued)

*Primary Examiner* — David Z Huang
(74) *Attorney, Agent, or Firm* — Reising Ethington PC (57) ABSTRACT

An apparatus for checking the tightness of a closure of a container, in particular a pharmaceutical or cosmetic container, the closure comprising a closure cap for closing the container and an elastic sealing member arranged between the closure cap and a mouth edge of the container, comprising: a turntable movable relatively against the closure of the container for exerting a compressive force on the elastic sealing member to effect compression of the elastic sealing member, wherein the turntable is connected to an axially displaceable drive shaft of a drive unit, and wherein the turntable is configured to be set in rotation with the container coupled thereto; a crimping device for crimping the closure cap; a control unit for controlling the drive unit; and a position encoder for providing a value representing a stroke position of the turntable.

21 Claims, 7 Drawing Sheets

(56) References Cited

U.S. PATENT DOCUMENTS

| | | | |
|---|---|---|---|
| 7,204,151 B2* | 4/2007 | Kitamoto | B67B 1/04 |
| | | | 53/484 |
| 2008/0250758 A1 | 10/2008 | Rauschnabel | |
| 2020/0299016 A1* | 9/2020 | Lancaster, III | B65B 57/04 |

FOREIGN PATENT DOCUMENTS

| | | |
|---|---|---|
| DE | 102005046428 A1 | 3/2007 |
| EP | 0482321 A1 | 4/1992 |

OTHER PUBLICATIONS

Informal English Translation of the Office Action issued by the German Patent Office for application DE10 2020 117 790.9 on Mar. 25, 2021.
Roman Mathaes; The pharmaceutical vial capping process: Container closure systems, capping equipment, regulatory framework, and seal quality tests; European Journal of Pharmaceutics and Biopharmaceutics; Nov. 30, 2015.
International Search Report and Written Opinion issued for PCT/EP2021/068541 on Oct. 7, 2021.
International Preliminary Report on Patentability issued for PCT/EP2021/068541 on Jan. 10, 2023.
Office Action issued by the Canadian Patent Office for application CA 3,184,837 on May 17, 2024.
Office Action issued by the Canadian Patent Office for application CA 3,184,837 on Apr. 24, 2025.

* cited by examiner

METHOD AND APPARATUS FOR CHECKING THE TIGHTNESS OF A CLOSURE

CROSS-REFERENCE TO RELATED APPLICATIONS

This is a Continuation application of International patent application PCT/EP2021/068541, filed Jul. 5, 2021, which claims the priority of German patent application DE 10 2020 117 790.9, filed Jul. 6, 2020. Both application PCT/EP2021/068541 and DE 10 2020 117 790.9 are herewith incorporated by reference in their entirety.

FIELD

The present invention generally relates to a method and an apparatus for checking the tightness of a closure of a container, in particular a pharmaceutical or cosmetic container, which comprises a closure cap for closing the container and an elastic sealing member arranged between the closure cap and a mouth edge of the container.

BACKGROUND

For the purpose of closing containers provided with pharmaceutical or cosmetic products, such as vials, carpules, infusion bottles or the like, it is common practice to provide a closure comprised of an elastic sealing member (e.g., a rubber stopper or a rubber disk) and a crimp cap pressing it against the mouth edge of the container with a defined force in order to ensure proper sealing of the container. In this way, for example, penetration of air, impurities or germs into the container as well as escape of a liquid from the container can be prevented.

An apparatus for closing containers is known, for example, from DE 10 2005 046 428 A1.

Closures of the initially mentioned type are usually produced in filling and crimping machines, wherein the crimp cap with the elastic sealing member is pressed onto the mouth edge of the container, and the free edge of the crimp cap, which is usually made of aluminum, is crimped about a flange or bead at the mouth edge of the container. After crimping, the elastic sealing member is held against a mouth edge of the container by means of the crimp cap and is thus biased.

In order to ensure a sufficiently good seal of the closure, the elastic sealing member must continue to be kept in an appropriately compressed state after completion of the crimping. However, the now inwardly folded free edge of the crimp cap can spring back after completed crimping under the effect of the biased elastic sealing member, which can lead to a reduced contact pressure between the elastic sealing member and the mouth edge of the container and ultimately to an insufficient sealing effect of the closure. Against this background, various methods have been developed for assessing the closing reliability of the stopper compression, ranging from a mere visual check of the closed container for assessing the crimping quality to the determination of the so-called "Residual Seal Force" (RSF).

A visual check, however, does not allow a reliable statement about the tightness of the closure or the stopper fit. RSF is understood as the force with which the elastic sealing member is tensioned between the crimp cap and the mouth edge of the container. The measurement of this force typically occurs with the aid of a test system that exerts an increasing test force on the top of the closure cap via a height-adjustable pressure block, wherein the state at which the flanks of the crimp cap lift off the bottom neck of the bottle is measured. These measurements then have to be correlated with established tightness investigations, so that the process merely allows an indirect statement about the closure reliability of the stopper seal.

An exemplary method and an associated apparatus for checking the closure reliability of a stopper compression are known, for example, from DE 10 2005 023 067 A1.

Using a pressure block on a surface of a metal cap mounted over a glass vial provided with a rubber stopper, it can be provided to apply a force to compress the rubber stopper. In this state, crimping of a lower end of a cylindrical section of the metal cap is performed. Subsequently, the force applied to the surface of the metal cap is released before a force is again applied on the metal cap, which gradually increases from a value lower than the force applied during the crimping operation to a value higher than the force applied during the fixing operation. While the force is increasing, a force is finally measured in the moment in which a downward shift in the height position of the upper surface of the metal cap is detected. This force is determined as the sealing force after the fixing process is completed. Finally, the sealing force is compared with a predefined force representing a proper closure, so that if there is a deviation between the sealing force and the predefined force, the product is classified as defective and discarded.

Furthermore, a method for checking the tightness of a closure of small pharmaceutical containers is known, for example, from DE 196 14 475 A1. Therein it is provided to measure the sealing force profile generated in the closure by vertical compression of the closure and to compare it with a predetermined profile. If the measured profile matches the predetermined profile, the tested closure is assessed as proper—the tested container can be released for delivery. If there are deviations between the profiles, the closure is classified as defective—the tested container is consequently discarded.

The methods known from DE 10 2005 023 067 A1 and DE 196 14 475 A1 have in common that, in order to assess the stopper compression, the sealing force with which the edge flange of the stopper rests on the mouth edge of the container is primarily determined. As can be inferred from DE 10 2005 023 067 A1, in order to assess the tightness of the closure in the state of the readily closed container, the closure cap is again subjected to a force so that the crimped flanks of the closure cap lift off the lower bottle neck.

Various further influencing factors which can disadvantageously affect the assessment of the quality of the closure are completely disregarded due to the lack of consideration of the state prior to crimping. For example, an insufficient stopper fit as well as influences caused by deviating manufacturing tolerances of stopper, crimp cap and/or container may remain unrecognized, since such influences cannot be detected by merely observing the sealing force following the crimping. This can lead to a decrease in closure quality and ultimately to incorrect assessments with regard to the closure reliability of the sealing member. Furthermore, the recording of entire sealing force profiles and their comparison with predetermined force profiles for assessing the tightness of a crimp closure is associated with high computing power.

Furthermore, known apparatuses for assessing closures of the initially mentioned type, in particular crimp closures, usually have several drive units and are equipped with a large number of mechanical, hydraulic and/or metrological components, which are usually associated with a complex structure as well as a high energy demand.

SUMMARY

Against this background, it is an object of the present application to provide an improved method for checking the tightness of a closure of a container.

Furthermore, it is an object of the present application to provide an improved apparatus for checking the tightness of a closure of a container.

According to a first aspect, therefore, a method is proposed for checking the tightness of a closure of a container, in particular a pharmaceutical or cosmetic container, the closure comprising a closure cap for closing the container and an elastic sealing member arranged between the closure cap and a mouth edge of the container, wherein the method comprises the following steps:

exerting a first test force on the elastic sealing member to effect compression of the elastic sealing member;

measuring a first end position value indicating a stroke position of the elastic sealing member resulting from the first test force;

exerting a crimp biasing force on the elastic sealing member, thereby pressing the elastic sealing member against the mouth edge of the container, and crimping the closure cap;

exerting a second test force on the elastic sealing member biased by the crimped closure cap; and measuring a second end position value indicating a stroke position of the biased elastic sealing member resulting from the second test force;

determining a comparison value based on the first end position value and the second end position value; and assessing the tightness of the closure by comparing the comparison value to a predefined threshold value.

The term "elastic sealing member" is hereby understood as an elastic or resilient stopper, e.g., a rubber stopper, an elastic or resilient rubber disc or an elastic or resilient sealing ring, e.g., an O-ring, for closing preferably pharmaceutical or cosmetic containers.

The exertion of the first test force, the crimp biasing force, and the second test force preferably occurs along an axis parallel to a longitudinal axis of the container. The compression of the elastic sealing member is caused by a relative movement between the closure cap and the container under the effect of force.

Prior to the actual crimping process, which is initiated with the exerting of the crimp biasing force, the first test force is exerted on the elastic sealing member and a corresponding first end position value representing a stroke position of the elastic sealing member is determined. The closure cap, which is preferably made of aluminum, encompasses the elastic sealing member with the crimp biasing force applied; its free end is thereby plastically deformed by crimping about a flange surrounding the mouth of the container. For crimping, the elastic sealing member is pressed against the mouth edge of the container, wherein the edge flange of the elastic sealing member is compressed in such a way that after completion of the crimping, the closure cap biases the edge flange of the elastic sealing member, which is under compressive stress, against the mouth edge of the container with a certain force. Subsequently, the second test force is exerted on the elastic sealing member and a corresponding second end position value representing a stroke position of the elastic sealing member is determined.

Such a first or second end position value may be, for example, representative of a stroke position of a movable component of a checking apparatus for checking the tightness of the closure (e.g., a stroke position of a test block configured as a turntable, a stroke position of a movable drive shaft of a linear-rotary motor) or of a downward stroke of the crimp cap as a result of the test force applied to the assembly of the container, elastic sealing member, and crimp cap.

An advantage of the method is that more disturbance factors, which can affect the quality of the closure, are taken into account for assessing the tightness of the closure. A further advantage lies in the "two-point measurement" underlying the method, according to which only two states are taken into account for assessing the tightness of the closure, namely the first end position value and the second end position value. In this way, a comparatively less complex measuring method is created that does not have to rely on entire force curve profiles to assess the crimping quality. The step of measuring the first and/or the second end position value or the step of determining a comparison value is thereby not limited to a "punctual sampling" of the respective stroke position value, but can also be carried out taking into account a group of stroke position values from which, for example, an end position value indicating the corresponding stroke position can be determined, in particular by averaging.

According to a second aspect, an apparatus is proposed for checking the tightness of a closure of a container, in particular a pharmaceutical or cosmetic container, the closure comprising a closure cap for closing the container and an elastic sealing member arranged between the closure cap and a mouth edge of the container. The apparatus comprises a turntable movable relatively against the closure of the container for exerting a compressive force on the elastic sealing member to effect compression of the elastic sealing member. The turntable is connected to an axially displaceable drive shaft of a drive unit and is configured to be set in rotation with the container coupled thereto. Furthermore, the apparatus comprises a crimping device for crimping the closure cap, a control unit for controlling the drive unit and a position encoder for providing a value representing a stroke position of the turntable.

According to the application, the apparatus for checking the tightness of the closure comprises a pressure block configured as a turntable. An advantage of this embodiment is that, compared to conventional testing apparatuses, fewer components and movable parts are required. While conventional testing apparatuses with an integrated crimping device are configured to mount the table receiving the container on a rotary shaft connected with a rotary motor in order to be rotated with the received container, and to provide above the table a separate, e.g. pneumatically actuated pressure block, the apparatus according to the application provides a turntable configured to perform rotary movements, stroke movements and combined rotary and stroke movements.

The term "position encoder" is hereby understood as a device for determining a value representing a stroke position of a movable component, e.g., a stroke position of the turntable, a stroke position of the stroke-rotation axis of the drive unit, or a stroke position of the crimp cap. For example, the position encoder according to the application can be an absolute encoder, an incremental encoder, or an optical distance sensor, e.g., optical reflection distance sensor, optical proximity switch, etc.

An advantage of the apparatus can be seen in that the rotation of the container relative to a fixing means of the crimping device required for establishing the crimping and the exertion of the corresponding compressive force required for compression of the elastic sealing member are realized exclusively by the driven turntable. This allows a compact and simple design of the apparatus. The apparatus may be provided as a single station or in a multi-station setup for simultaneous processing of a plurality of containers. Furthermore, an arrangement of the apparatus in a rotor may be provided, for example as part of a rail-type closure station configured to support and process a plurality of containers.

In a first refinement of the method, it can be provided that the first test force is equal to the second test force.

An advantage of this refinement is that a simplified method is provided for assessing the tightness of the closure, since the same test force is always exerted on the elastic sealing member before and after the crimping, instead of different test forces. A further advantage of this refinement is that a limited stroke position range is established for the first end position value assigned to the first test force and/or the second end position value assigned to the second test force, so that a more precise assessment of the closure reliability under consideration of further error sources is enabled. Alternatively, it can be provided that the first test force is equal to the crimp biasing force.

In a further refinement of the method, it can be provided that the crimp biasing force is greater than the first test force and/or the second test force.

Through this refinement, an improved measurement method and a more efficient error detection can be realized. The magnitude of the first test force lies preferably in a range that is sufficient to align and place the container, the elastic sealing member and the closure cap against each other prior to the crimping process. In particular, the amount of the first and/or the second test force can be selected such that the flexible sealing element subjected to the respective test force does not compress or compresses only slightly. Therefore, when assessing the tightness of the closure by comparing the comparison value with a predefined threshold value, for example on the basis of a difference between the first end position value and the second end position value, a maximum difference value is also obtained, which benefits the measurement accuracy. The first test force and/or the second test force can preferably each amount to between 5% and 60%, e.g., 10%, of the crimp biasing force. However, the amount of the respective test force is not limited to this range of values and can also lie outside this range of values, for example.

If, for example, the step of exerting the first test force on the elastic sealing member is performed with a force smaller than the crimp biasing force, the elastic sealing member subjected to the crimp biasing force will have a stroke position that is greater in magnitude than the stroke position resulting from the first test force. As a result of an improperly performed crimping, it may happen that the biased elastic sealing member expands and displaces the closure cap relative to the container. If now the second test force is applied, which is preferably smaller than the crimp biasing force, a return of the elastic sealing member to a state in which the elastic sealing member is returned to its previous, in particular crimped stroke position, can be avoided by applying the second test force. Such a return to the stroke position corresponding to the crimp biasing force, or beyond it, would make it considerably more difficult to detect faulty crimping, since the resulting displacement of the closure cap relative to the container would be compensated.

Optionally, it can be provided that, on the one hand, the crimp biasing force is greater than the first test force and the second test force, and, on the other hand, the first test force is equal to the second test force. In this way, fault detection can be further optimized. If the first test force is equal to the second test force but smaller than the crimp biasing force, for example, an improperly performed crimping results in a stroke position for the second end position value that lies between the stroke position resulting from the first test force and a stroke position corresponding to the crimp biasing force.

In a further refinement of the method, it can be provided that a transition between the exerting the first test force, the exerting the crimp biasing force, and the exerting the second test force each occurs continuously without completely releasing the corresponding compressive force on the elastic sealing member.

In this way, the checking method can be performed more efficiently compared to a configuration that provides for resetting to a rest position after each step of exerting the corresponding compressive force.

In a further refinement of the method, it can be provided that between the exerting the first test force and the exerting the second test force, stroke positions of the elastic sealing member are continuously recorded and stored.

In other words, between the exertion of the first test force via the carrying out of the crimp force up to the exertion of the second test force, a stroke position profile or a stroke position course, in particular a continuous stroke position course, is recorded and stored. Such stroke position profiles can be taken into account, for example, when assessing the crimping quality. In particular, it can be provided that, in order to assess the closure quality, a stroke position profile determined in connection with a closure to be tested is compared with a predefined stroke position profile of a proper closure, so that if the determined stroke position profile deviates from the predefined stroke position profile, the container with the tested closure is classified as improper.

In a further refinement of the method, it can be provided that the determined comparison value is a difference between the first end position value and the second end position value.

In other words, the assessment of the tightness of the closure is performed by comparison of a comparison value, which is a difference between the first end position value and the second end position value, with a predefined threshold value. The comparison of such a difference value under consideration of only two end position values, namely one before the crimping and one after the crimping, allows for efficient checking of the tightness of the closure, particularly with regard to the required computing power and processing speed. Preferably, an amount of the difference between the first end position value and the second end position value is formed to assess the tightness of the closure.

The assessment of the tightness of the closure on the basis of such a difference formation is characterized in comparison with an absolute value comparison, in which the first end position value and the second end position value are each compared directly with a corresponding predefined end position value of a proper closure, by the fact that an absolute comparison is regularly associated with more computational effort and can lead to more inaccurate assessments due to manufacturing tolerances of the closure cap, the elastic sealing member and/or the container.

In a further refinement of the method, it can be provided that the determined comparison value is a quotient between the first end position value and the second end position value.

In other words, the assessment of the tightness of the closure is performed by comparison of a comparison value, which is a quotient between the first end position value and the second end position value, with a predefined threshold value. The comparison of such a quotient under consideration of only two end position values, namely one before crimping and one after crimping, allows an efficient checking of the tightness of the closure, particularly with respect to the required computing power and processing speed.

In a further refinement of the method, it can be provided that if the determined comparison value deviates from the predefined threshold value representing a proper closure, the closure to be checked is classified as improper.

The predefined threshold value is preferably a value suitable for assessing the tightness of the closure to be checked. For example, the predefined threshold value can represent an end position difference or end position quotient of a reference closure that is classified as being proper. For example, the predefined threshold value can be determined based on a properly sealing closure of an optimal container or based on an average value representing a plurality of properly sealed closures.

In a further refinement of the method, it may be provided that the predefined threshold value comprises a tolerance band of predefined end position differences or predefined end position quotients of proper closures, wherein the closure to be checked is classified as proper if the determined comparison value is within the tolerance band.

In other words, a tolerance band of threshold values of proper closures is determined on the basis of boundary threshold values. The assessment of the tightness of a closure to be checked is preferably carried out such that it is checked whether the determined comparison value lies within this tolerance band. The boundary values can, for example, be values that represent the upper and lower boundaries of a closure that still seals just adequately.

In a further refinement of the method, it can be provided that for assessing the tightness of the closure, in addition to the step of comparing the determined comparison value with the predefined threshold value, the second end position value which indicates the stroke position of the biased elastic sealing member resulting from the second test force is compared with a predefined end position value of a proper closure, wherein the predefined end position value of the proper closure indicates a stroke position of an elastic sealing member of the proper closure subjected to the second test force.

Through the additional comparison of the second end position value corresponding to the closure to be checked with a predefined end position value of a proper closure, a more precise assessment of the closure tightness is enabled. In addition, in this way a precise assignment of an occurred defect to the state before crimping or to the state after crimping is enabled. Although the determination of a comparison value on the basis of a difference or a quotient indicates that the closure tightness is not proper, it does not provide precise information as to whether the cause of the defect lies before the crimping process, e.g., due to improper fit of the stopper, or after the crimping process, e.g., due to improper crimping.

In a further refinement of the method, it can be provided that for assessing the tightness of the closure, in addition to the step of comparing the determined comparison value with the predefined threshold value, the first end position value which indicates the stroke position of the elastic sealing member resulting from the first test force is compared with a predefined end position value of a proper closure, wherein the predefined end position value of the proper closure indicates a stroke position of an elastic sealing member of the proper closure subjected to the first test force.

Through the additional comparison of the first end position value corresponding to the closure to be checked with a predefined end position value of a proper closure, a more precise assessment of the closure tightness is enabled. In addition, in this way a precise assignment of a defect that has occurred to the state before crimping or to the state after crimping is enabled. For further improvement of the assessment quality, it can optionally be provided that, in addition to the step of comparing the determined comparison value with the predefined threshold value, the first end position value is compared with a predefined end position value and the second end position value is compared with a further predefined end position value of a proper closure.

In a further refinement of the method, it can be provided that at least one of the steps of measuring the first end position value resulting from the first test force or measuring the second end position value resulting from the second test force is performed on the basis of an optical distance measurement and/or a magnetic length measurement.

Such an optical distance measurement can be performed, for example, using a transit time measurement, a phase shift measurement, or a triangulation of light, in particular lasers. For the transit time measurement, for example, a light pulse is emitted and a pulse transit time is measured. The pulse transit time is the transit time required by the light beam to travel from a beam source to a reflector, e.g., a retroreflector, and back to the beam source. By measuring this transit time, a distance between the beam source and the object can ultimately be determined via the speed of light. This determined distance can, for example, indicate a value representing a stroke position of the elastic sealing member. In optical triangulation, on the other hand, a laser beam is preferably focused on the measurement object and observed with a sensor element, e.g., a camera, a spatial resolution photodiode or a CCD line. If the distance of the measuring object from the sensor element changes, the angle at which the light point is observed also changes and thus the position of its image on the receiver, e.g., the photoreceiver. From the change in position, the distance of the object from the laser projector can be calculated with the aid of mathematical, in particular trigonometric, relationships.

A deflection or compression of the elastic sealing member as a result of the application of a compressive force directly expresses itself in a stroke position change of a component causing the relative movement between the closure cap and the container, e.g. in a stroke position change of a test block for exerting a compressive force on the elastic sealing member, of a drive axis driving the test block, or in a stroke position change of the pressurized container or the pressurized closure cap itself. By optically measuring a distance between an optical sensor of a distance measuring device and one of the aforementioned components, different end position values can thus be determined. Optionally, the determination of the first and/or the second end position value can also be performed by means of a magnetic distance measuring system. Magnetic measuring systems have the advantage over optical devices in that they are largely insensitive to contamination, e.g., oil or other liquids. For example, the measurement of the respective end position value can be carried out with the aid of at least one magnetic sensor. This may be, for example, a magnetoresistive sensor, a Hall sensor or the like.

In a further refinement of the method, it can be provided that the exerting the first test force and the exerting the second test force are each actuated by a drive unit, in particular a linear-rotary motor, wherein at least one of the steps of measuring the first end position value or measuring the second end position value is performed on the basis of a position detection in the drive unit.

In comparison to conventional checking methods, which require a plurality of drive units and additional measuring devices, the assessment of the tightness of the closure is thus simplified by the use of characteristic values of the drive unit. Furthermore, the preferred use of a linear-rotary motor, with which arbitrary combinations of linear and rotary movements can be realized, allows a simplified checking method by utilizing synergistic effects.

In a further refinement of the apparatus, it can be provided that the drive shaft of the drive unit is configured to be rotatable.

In other words, the drive shaft is configured to be rotatable and axially displaceable. In this way, an arbitrarily combinable linear and rotational movement of the container coupled with the turntable can be realized. According to the application, both pressing of the container provided with the closure and rotation of the container for the crimping process can therefore be realized by means of the drive shaft connected to the drive unit. This in turn enables a compact and simplified design of the apparatus.

The apparatus preferably comprises a receptacle for releasably receiving an end portion of the container or of the closure cap. The turntable and the receptacle may be arranged, for example, at opposite end portions of the container carrying the closure cap. Preferably, the counter receptacle is configured to be freely rotatable to allow rotation of the container during the crimping process.

In a further refinement of the apparatus, it may be provided that the drive unit is a linear-rotary motor.

A generic linear-rotary motor is known, for example, from EP 0 482 321 A1. The use of a linear-rotary motor enables an arbitrarily combinable linear and rotational movement of the turntable. In this way, both mutual compressing of the closure and the container and rotation of the container for the crimping process can be implemented. This in turn enables a compact and simplified design of the apparatus.

In a further refinement of the apparatus, it can be provided that the position encoder is a motor sensor configured to determine the value representing the stroke position of the turntable.

For example, the position encoder according to the application may comprise an absolute encoder or an incremental encoder.

One of the performance characteristics of a linear motor or a linear-rotary motor is the precise position control of the slider, which requires an accurate detection of the slider position relative to the stator. According to the application, it is now provided to set the turntable in rotational and/or translational movement by means of the slider. The provision of the value representing the stroke position of the turntable is preferably based on position data of the slider. For example, in tubular linear motors and in linear-rotary motors, the permanent magnets located in the slider are used not only for driving, but also as information carriers for position detection. For this purpose, for example, two magnetic field sensors, e.g., Hall sensors, can be located in the stator of the motor that are arranged spaced apart from each other in the longitudinal direction. The two Hall sensors measure the magnetic field, which is periodic in the longitudinal direction, and generate phase-shifted signal characteristics when the slider is moved linearly relative to the stator, and thus to the two Hall sensors, the evaluation of which, e.g., by means of a so-called "sine-cosine evaluation", enables exact position determination.

In a further refinement of the apparatus, it can be provided that the position encoder is an optical sensor configured to optically determine the value representing the stroke position of the turntable.

In this way, precise stroke position detection is enabled.

The optical sensor may comprise, for example, an optical diffuse sensor or an optical proximity switch. Optical diffuse sensors usually comprise a transmitter and a receiver unit and use the measuring object in the detection field of the sensor as a reflector. The measuring object thereby reflects the light beam emitted by the transmitter unit. Such an optical distance measurement can be carried out, for example, by means of a transit time measurement, a phase shift measurement or a triangulation of light, in particular laser.

In a further refinement of the apparatus, it can be provided that the position encoder is a motor sensor configured to determine the value representing the stroke position of the turntable, and in that the apparatus comprises a further position encoder, wherein the further position encoder is an optical reflection sensor configured to optically determine the value representing the stroke position of the turntable.

In other words, in addition to the motor sensor, an optical sensor is provided. This provides additional redundancy and high measurement accuracy.

In a further refinement of the apparatus, it can be provided that the crimping device comprises at least one fixing means movable transversely to a longitudinal axis of the container, which is movable between a position in which the fixing means is pressed against the closure cap to plastically deform a free end of the closure cap and a position in which it is spaced from the closure cap.

The crimping device, together with the turntable configured to be rotatable and height adjustable, enables a compact design of the apparatus and further enables precise in-process control of the closure reliability.

In a further refinement of the apparatus, it can be provided that the control unit is further configured to bring the fixing means into abutment with the crimp closure cap while the container is set in rotation.

For the purpose of crimping, the elastic sealing member is loaded with a crimp biasing force and consequently compressed. Subsequently, the fixing means is moved into the position in which it is pressed against the closure cap. Thereby, it must be ensured on the one hand that the stroke position of the turntable with the container coupled thereto remains essentially constant, and on the other hand that the container is set in rotation for crimping.

In a further refinement of the apparatus, it can be provided that the apparatus is further configured to perform the following steps: exerting, by means of the drive unit, a first test force on the elastic sealing member to effect compression of the elastic sealing member; measuring, by means of the position encoder, a first end position value indicating a stroke position of the elastic sealing member resulting from the first test force; exerting, by means of the drive unit, a crimp biasing force on the elastic sealing member, thereby pressing the elastic sealing member against the mouth edge of the container, and crimping the closure cap; exerting, by means of the drive unit, a second test force on the elastic sealing member biased by the crimped closure cap; and measuring, by means of the position encoder, a second end position value indicating a stroke position of the biased elastic sealing member resulting from the second test force; determining, by means of a comparison unit, a comparison value based on the first end position value and the second end position value; and assessing, by means of the comparison unit, the tightness of the closure by comparing the comparison value to a predefined threshold value.

In this manner, the apparatus can be designed and configured to perform the method according to the first aspect or any refinement thereof.

The control unit and the comparison unit can, for example, be the same computer unit or processing unit. On this unit, processes can be executed in a software-implemented manner that implement the corresponding steps. In this way, a fully automated checking process can be implemented during crimping. In particular, it can be provided that the computer unit, which comprises the control unit and the processing unit and optionally a memory unit, is configured to execute a computer program product that includes instructions that cause the computer unit or the processing unit to execute these steps.

It will be appreciated that the aforementioned features and the features still to be explained below can be used not only in the respectively cited combination, but also in other combinations or singly, without departing from the scope of the present invention. Furthermore, the refinements described for the apparatus can also form refinements of the method and vice versa.

DRAWINGS

Embodiments of the invention are shown in the drawings and are explained in more detail in the following description. Showing.

DETAILED DESCRIPTION

Figure 1:
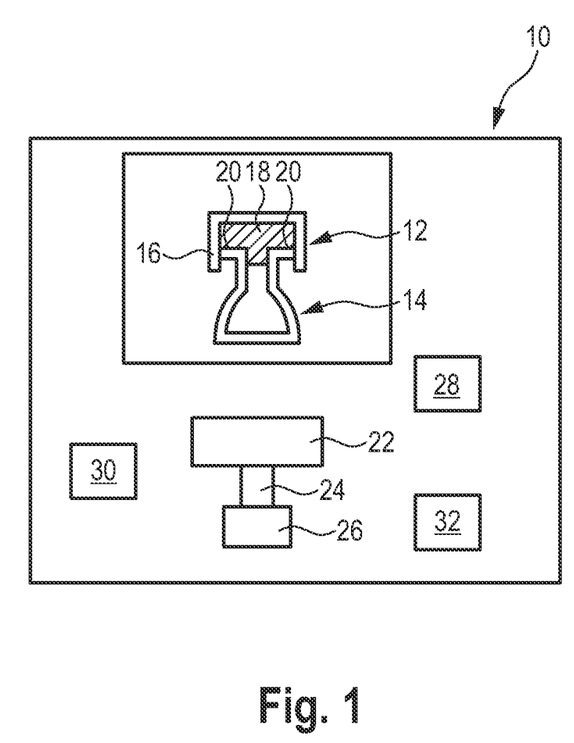
FIG. 1 a schematic view of an embodiment of an apparatus for checking the tightness of a closure, FIG. 2 an isometric view of an embodiment of an apparatus for checking the tightness of a closure, FIG. 3 an isometric view of an embodiment of an apparatus for checking the tightness of a closure, FIG. 4 a schematic view of an embodiment of a method for checking the tightness of a closure, FIGS. 5A-5C a schematic sequence of an embodiment of a method for checking the tightness of a closure, FIG. 6 a force-displacement diagram according to an embodiment of a method for checking the tightness of a closure, and FIG. 7 a force-displacement diagram according to an embodiment of a method for checking the tightness of a closure.

FIG. 1 shows a schematic view of an embodiment of an apparatus 10 for checking the tightness of a closure 12 of a container 14. The container 14 is preferably a pharmaceutical or cosmetic container, such as a vial, a carpule, an infusion bottle, or the like.

The closure 12 comprises a closure cap 16 and an elastic sealing member 18, for example a stopper, in particular a rubber stopper, a sealing washer, an O-ring or the like. The elastic sealing member 18 is thereby arranged between the closure cap 16 and a mouth edge 20 of the container 14. The elastic sealing member 18 shown in FIG. 1 is exemplarily configured as a rubber stopper driven into the container 14.

Furthermore, the apparatus 10 comprises a turntable 22 configured to exert a compressive force on the elastic sealing member 18. The turntable 22 is operatively connected with a drive shaft 24 of a drive unit 26. In this way, the turntable 22 is actuatable by the drive unit 26. The drive unit 26 is preferably configured to perform a stroking movement and/or a rotational movement of the drive shaft 24, and thus of the turntable 22. Furthermore, the apparatus 10 comprises a crimping device 28 for crimping the closure cap 16 and a control unit 30 for controlling the drive unit 26. The turntable 22 connected to the drive shaft 24 is preferably movable along an axis of rotation of the drive shaft 24, which is not shown. Furthermore, the apparatus 10 comprises a position encoder 32. The position encoder 32 is configured to provide a value representing a stroke position of the turntable 22.

Figure 2:
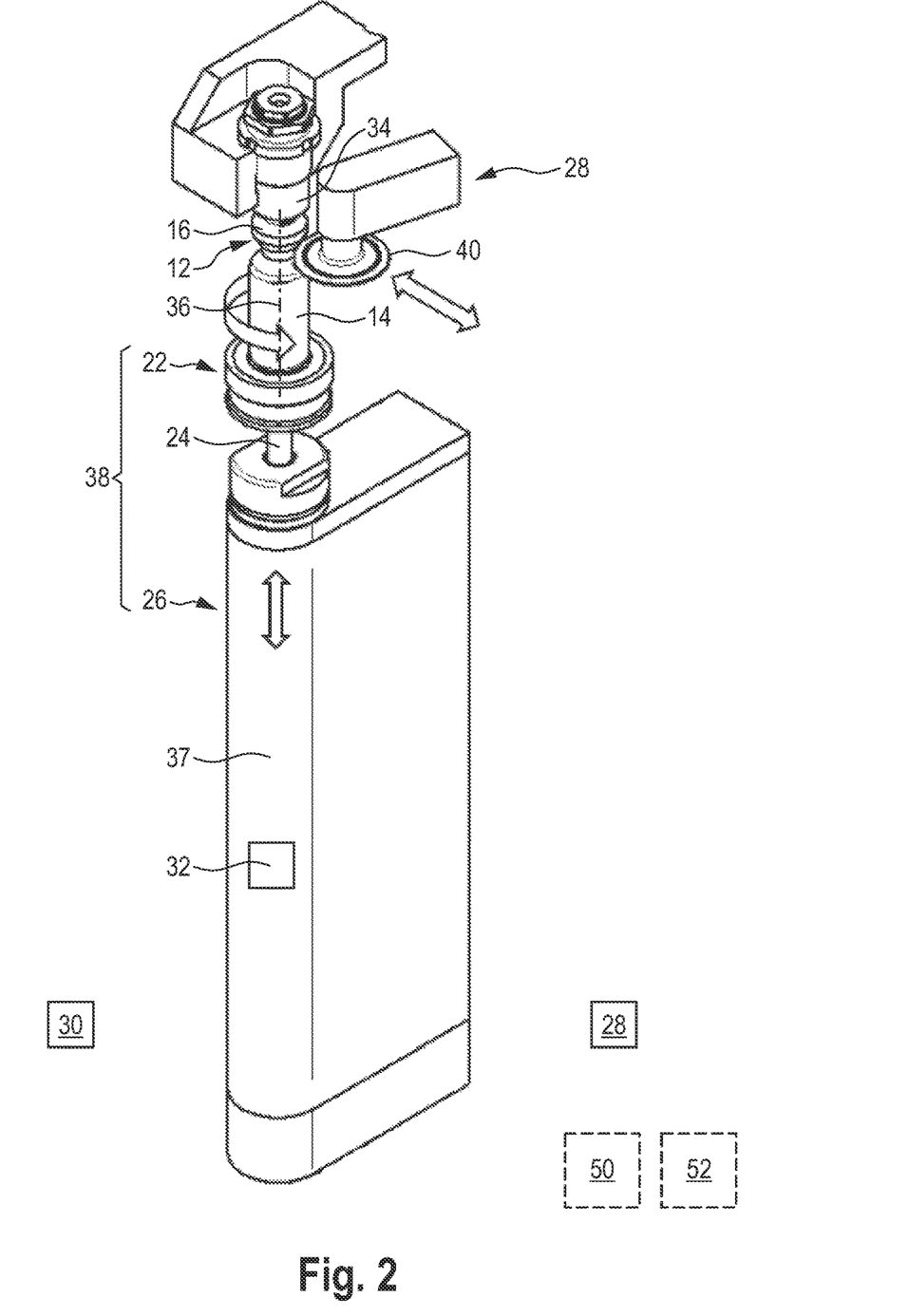

FIG. 2 shows an isometric view of an embodiment of the apparatus 10. The same elements are identified by the same reference signs, in the following only the differences are explained.

In the illustrated embodiment of the apparatus 10, the container 14 provided with the closure 12 is arranged between the turntable 22 and a receptacle 34. The receptacle 34 is preferably configured to freely rotatably receive the closure 12 of the container 14. In this way, the motor-operated turntable 22 coupled to the container 14 can be set in rotation during a crimping process.

The turntable 22 is hereby arranged below the container 14, whereas the receptacle 34 is arranged above the container 14. Alternatively, it can be provided that the turntable 22 is arranged above the container 14 and the receptacle 34 is arranged below the container 14. In such an alternative embodiment, the container 14 is freely rotatably received in the receptacle 34 and the closure 12 is coupled with the turntable 22.

The turntable 22 is operatively connected via the drive shaft 24 with the drive unit 26 which is preferably configured as a linear-rotary motor. Furthermore, the embodiment of the apparatus 10 shown in FIG. 2 provides a position encoder 32 configured as a motor sensor. The determination of the value representing the stroke position of the turntable 22 is thereby preferably based on a position detection of the drive shaft 24 received in a drive train 37 for the stroke and rotation movement. The turntable 22, the drive shaft 24 and the drive unit 26 together form the stroke device 38.

The crimping device 28 herein comprises a fixing means or fixing element 40 movable transversely to a longitudinal axis 36 of the container 14, the fixing means or fixing element 40 being movable between a position in which the fixing means 40 is pressed against the closure cap 16 and a position in which it is spaced from the closure cap 16.

Figure 3:
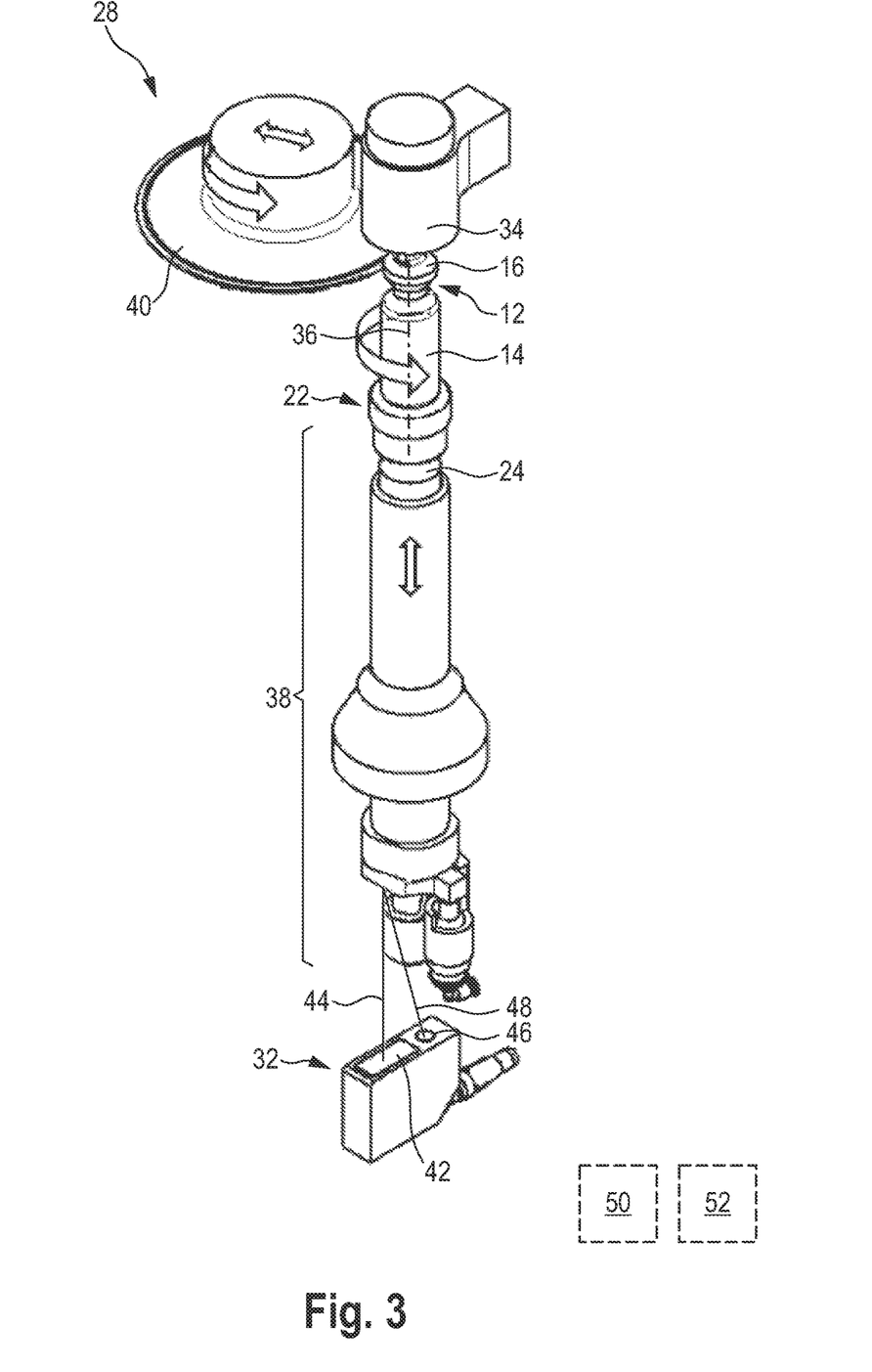

FIG. 3 shows an isometric view of an embodiment of the apparatus 10. The same elements are identified by the same reference signs, in the following only the differences are described.

The apparatus 10 shown in FIG. 3 differs from the apparatus 10 shown in FIG. 2 in that the position encoder 32 for providing a value representing a stroke position of the turntable 22 is an optical sensor. Furthermore, the drive train 37 is hidden in FIG. 3 for the sake of clarity.

The position encoder 32 configured as an optical sensor may comprise, for example, a beam source 42 for emitting a transmission light beam 44 and a detector 46 for receiving a reception light beam 48 reflected from a component of the stroke device 38. Based on a transit time measurement, a phase shift measurement, or a laser triangulation measurement, a value representing a distance between the position encoder 32 configured as an optical sensor and the component of the stroke device 38, and thus a stroke position of the turntable 22, can thus be determined.

The apparatus 10 may further comprise a memory unit 50 for storing at least one end position or stroke position value determined by the position encoder 32, and for storing at least one threshold value representing a stroke position of a proper closure 12.

Furthermore, the apparatus 10 may comprise a comparison unit 52 that compares values determined by the position encoder 32 with values stored in the memory unit 50, and determines whether they are or are not in a proper range.

Figure 4:
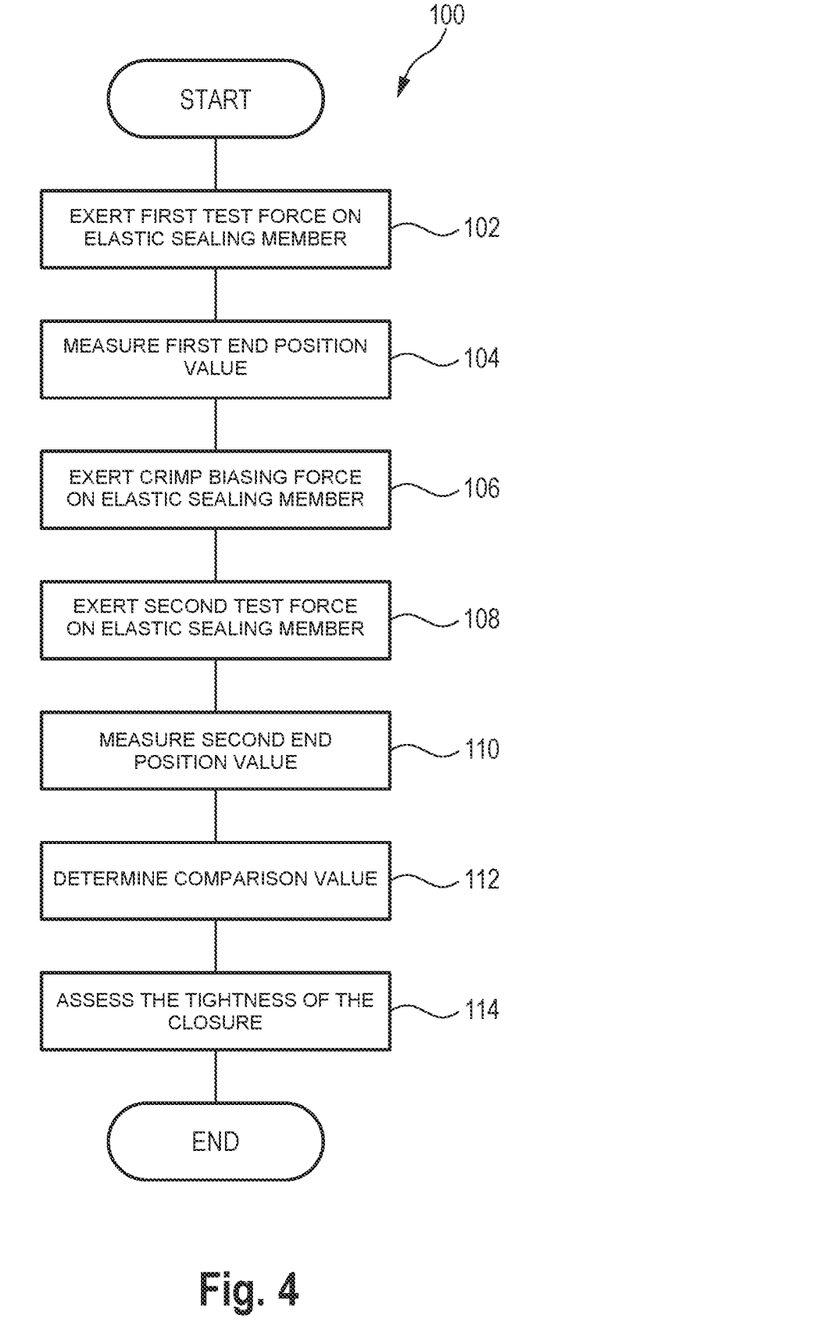

FIG. 4 shows a schematic view of an embodiment of a method 100 for checking the tightness of a closure 12 of a container 14. The method 100 can be performed, for example, using the apparatus 10 described in FIGS. 1 to 3.

In a first step 102 of the method 100, a first test force is applied to the elastic sealing member 18 to effect a compression of the elastic sealing member 18.

In a further step 104 of the method 100, a first end position value is measured indicating a stroke position of the elastic sealing member 18 resulting from the first test force.

In a further step 106 of the method 100, a crimp biasing force is exerted on the elastic sealing member 18, thereby pressing the elastic sealing member 18 against the mouth edge 20 of the container 14, and crimping the closure cap 16.

In a further step 108 of the method 100, a second test force is applied to the elastic sealing member 18 biased by the crimped closure cap 16.

In a further step 110 of the method 100, a second end position value is measured that indicates a stroke position of the biased elastic sealing member 18 resulting from the second test force.

In a further step 112 of the method 100, a comparison value is determined based on the first end position value and the second end position value.

In a further step 114 of the method 100, the tightness of the closure 12 is assessed by comparing the comparison value with a predefined threshold value.

In an optional embodiment of the method 100, it can be provided that the second test force is equal to the first test force.

In a further optional embodiment of the method 100, it can be provided that the crimp biasing force is greater than the first test force and/or the second test force.

In a further optional embodiment of the method 100, it can be provided that a transition between exerting the first test force, exerting the crimp biasing force, and exerting the second test force each occurs continuously without completely releasing the corresponding compressive force on the elastic sealing member.

In a further optional embodiment of the method 100, it can be provided that between exerting the first test force and exerting the second test force, stroke positions of the elastic sealing member 18 are continuously recorded and stored. In an optional embodiment of step 112 of the method 100, it can be provided that the determined comparison value is a difference between the first end position value and the second end position value.

In an optional embodiment of step 112 of the method 100, it can be provided that the determined comparison value is a quotient between the first end position value and the second end position value.

In an optional embodiment of step 114 of the method 100, it can be provided that if the determined comparison value deviates from the predefined threshold value representing a proper closure 12, the closure 12 to be checked is classified as improper.

In a further optional embodiment of step 114 of the method 100, it can be provided that the predefined threshold value comprises a tolerance band of predefined end position differences or predefined end position quotients of proper closures 12, wherein the closure 12 to be checked is classified as proper if the determined comparison value lies within the tolerance band.

In a further optional embodiment of step 114 of the method 100, it can be provided that, for assessing the tightness of the closure 12, in addition to the step of comparing the determined comparison value with the predefined threshold value, the second end position value indicating the stroke position of the biased elastic sealing member 18 resulting from the second test force is compared with a predefined end position value of a proper closure 12, wherein the predefined end position value of the proper closure 12 indicates a stroke position of an elastic sealing member 18 of the proper closure subjected to the second test force.

In a further optional embodiment of step 114 of the method 100, it can be provided that for assessing the tightness of the closure 12, in addition to the step of comparing the determined comparison value with the predefined threshold value, the first end position value indicating the stroke position of the elastic sealing member 18 resulting from the first test force is compared with a predefined end position value of a proper closure 12, wherein the predefined end position value of the proper closure 12 indicates a stroke position of an elastic sealing member 18 of the proper closure subjected to the first test force.

In a further optional embodiment of the method 100, it can be provided that at least one of the steps of measuring 104 the first end position value resulting from the first test force or measuring 110 the second end position value resulting from the second test force is performed on the basis of an optical distance measurement and/or a magnetic length measurement.

In a further optional embodiment of the method 100, it can be provided that the exerting in step 102 of the first test force and the exerting in step 108 of the second test force are each actuated by a drive unit 26, in particular a linear-rotary motor, wherein at least one of the steps of measuring 104 the first end position value or measuring 110 the second end position value is performed on the basis of a position detection in the drive unit 26.

Figure 5A:
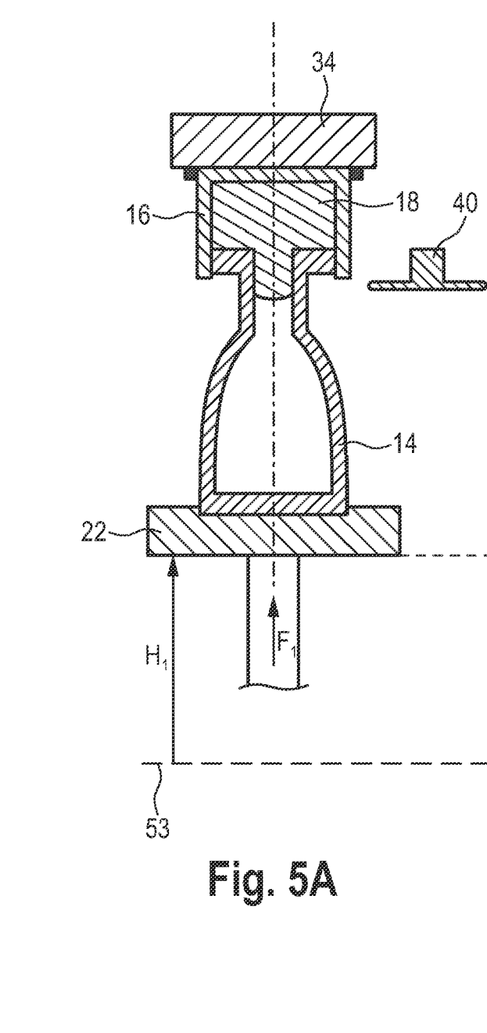
Figure 5B:
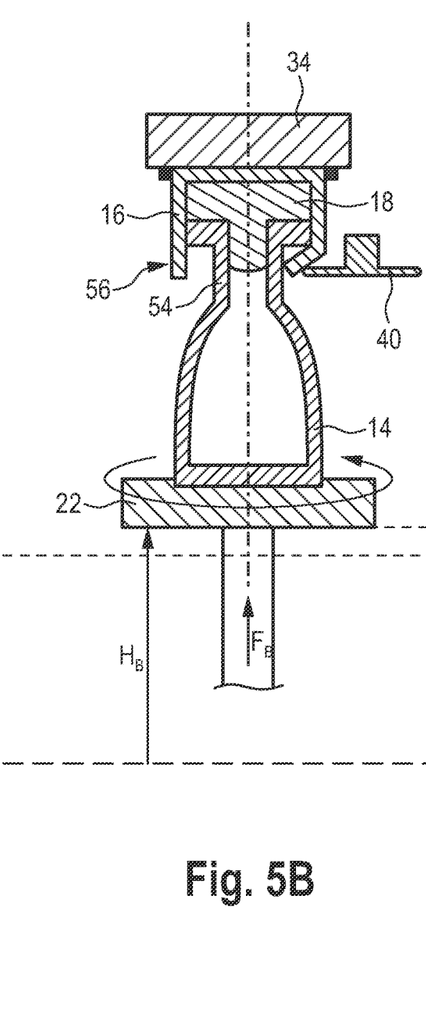
Figure 5C:
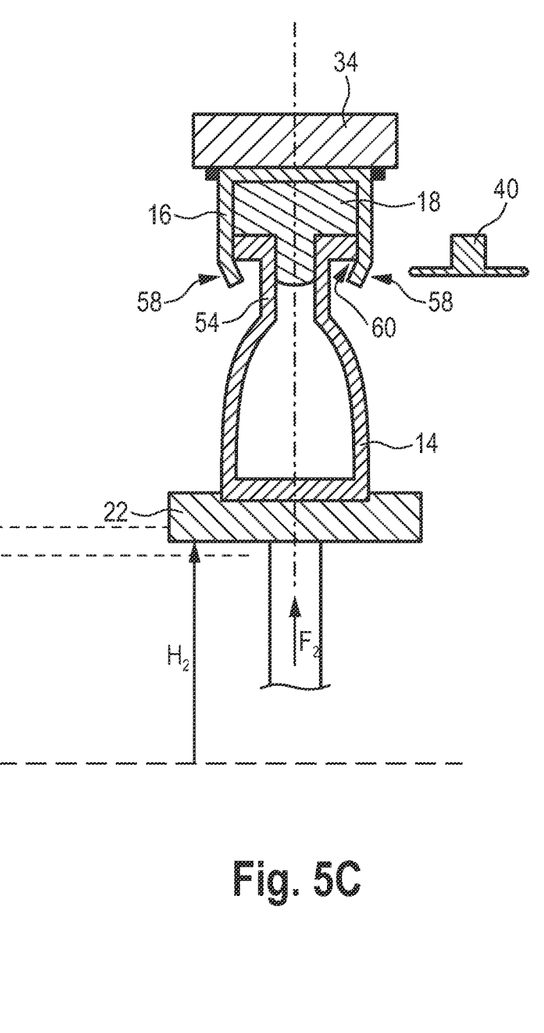

FIGS. 5A to 5C show a schematic sequence of an embodiment of the method 100. The container 14 provided with the closure 12 is thereby provided between the turntable 22 and the receptacle 34.

With reference to FIG. 5A, the elastic sealing member 18 is subjected to a first axial test force F1 prior to the actual crimping process, whereby the elastic sealing member 18 is compressed. As a result, the turntable 22 exerting the compressive force F1 on the flexible sealing member 18 via the container 14 is moved from a rest position 53, in which the turntable 22 preferably exerts no compressive force on the flexible sealing member 18, to a first stroke position H1. The first stroke position H1 is measured and stored in the form of a first end position value. The closure cap 16 does not yet close the container 14 at this point, so that the fixing means 40 is spaced from the closure cap 16 in FIG. 5A.

During the crimping process, illustrated in FIG. 5B, the axial compressive force is preferably increased up to the crimp biasing force FB so that the flexible sealing element 18 is sufficiently compressed, resulting in a protrusion 56 of the closure cap 16 at a rolled edge 54 of the container 14. This protrusion 56 of the closure cap 16 is crimped by the fixing means 40, e.g., a crimping roller, to the rolled edge 54 of the container 14, while the turntable 22 exerting the crimp biasing force FB on the flexible sealing element 18 is set in rotation with the container 14 coupled thereto.

Since the amount of the crimp biasing force FB is preferably greater than the amount of the first test force F1, the elastic sealing member 18 is compressed more strongly under the action of the crimp biasing force FB than in the configuration shown in FIG. 5A. Consequently, during the crimping process, a stroke position HB of the turntable 22 is established that is greater than the first stroke position H1 of the turntable 22 shown in FIG. 5A. After completion of the crimping, the fixing means 40 is brought out of abutment with the closure cap 16 and the crimp biasing force FB is at least partially released.

If the crimping is not performed properly, the crimped protrusion 56 of the closure cap 16 may loosen, so that the elastic sealing member 18 is at least partially decompressed, causing the closure cap 16 and the container 14 to move away from each other relative to each other.

With reference to FIG. 5C, the elastic sealing member 18 is subsequently subjected to a second test force F2. Again, the corresponding stroke position H2 is measured and stored in the form of a second end position value. The second test force F2 is preferably equal to the first test force F1 and preferably smaller than the crimp biasing force FB. In this way, it is ensured that the stroke position H2 of the turntable 22 during the exerting the second test force F2 on the flexible sealing member 18 is smaller than the stroke position HB resulting from the crimp biasing force FB. In this way, it can be ensured that during the exerting the second test force F2 on the flexible sealing member 18, the crimped flanks 58 of the closure cap do not lift off from the lower bottle neck 60, thereby enabling destruction-free checking of the tightness of the closure 12. Ultimately, based on the first end position value and the second end position value, a comparison value is determined and the tightness of the closure 12 is assessed by comparing the comparison value to a predefined threshold value.

Figure 6:
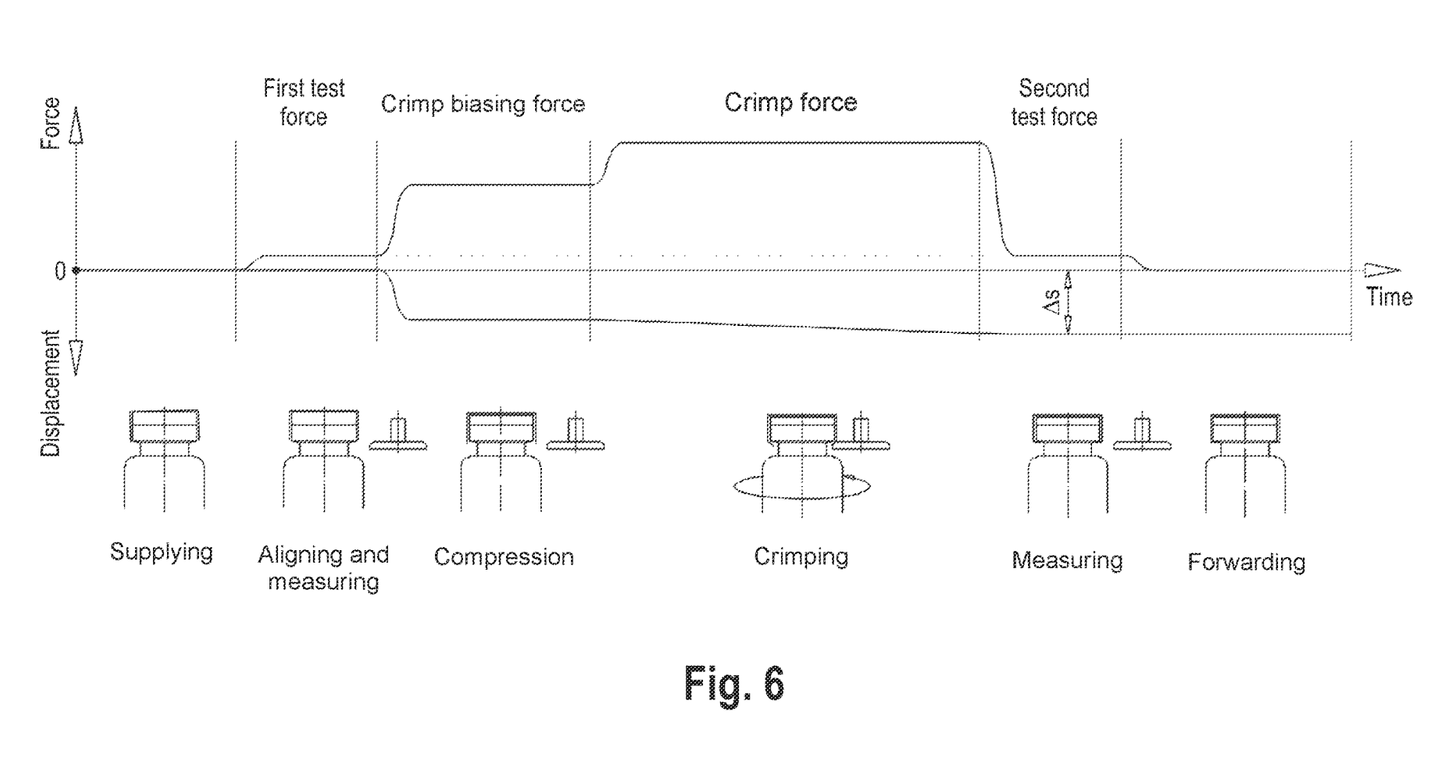

FIG. 6 shows a force-displacement diagram according to an embodiment of a method 100. Thereby, both the compressive force curve exerted on the elastic sealing member 18 and the stroke position course or displacement course resulting from the compressive force of a component of the apparatus 10 for checking the tightness of the closure 12, e.g., a stroke position of a test block 22 configured as a turntable or a stroke position of a height-movable drive axis, are graphically plotted against time. The "crimp biasing force" shown in FIG. 6 is composed of the crimp biasing force and a process force. This process force occurs when the free end 56 of the closure cap 16 is bent over by the fixing means 40, whereby the closure cap 16 is additionally pulled downward by the crimping, whereby an additional compressive force acts on the elastic sealing member.

In an optional first step, the container 14 is provided with the closure cap 16 and the flexible sealing element 18 arranged between the closure cap 16 and the mouth edge 20 of the container 14. For example, the container 14 together with the closure cap 16 and the flexible sealing element 18 can be supplied to an apparatus 10 according to FIGS. 1 to 3.

The elastic sealing member 18 is subjected to a first axial test force prior to the actual crimping process, cf. step 102 of method 100. In the illustrated force-displacement diagram, the first test force is selected such that the stroke resulting from the first test force from the rest position is only slight. The amount of the first test force is preferably in a range that is sufficient to align and place the container 14, the elastic sealing member 18 and the closure cap 16 against each other prior to the crimping process.

In a further step 106 of the method 100, the compressive force exerted on the flexible sealing member 18 is increased to the value of the crimp biasing force, whereby the flexible sealing member 18 is compressed. Hereby, the fixing means 40 of the crimping device 28 is initially out of abutment with the crimp closure cap 16. As soon as the fixing means 40 is brought into abutment with the closure cap 16 for crimping the free end 56 of the closure cap 16, an additional downward force or process force is applied to the closure cap 16. The sum of the crimp biasing force and the process force is shown in FIG. 6 as crimp force. As can be seen in FIG. 6, the stroke from the rest position increases as a result of the crimping.

In a further step 108 of the method 100, the elastic sealing member 18 is subjected to a second test force. In the illustrated force-displacement diagram, the second test force is equal to the first test force and less than the crimp biasing force. Since the second test force is less than the crimp biasing force, the flexible sealing element 18 is not moved any further so that the stroke position corresponding to the second test force is identical to the stroke position at the end of the crimping process.

Ultimately, based on the stroke position value corresponding to the first test force and the stroke position value corresponding to the second test force, a comparison value is determined and the tightness of the closure 12 is assessed by comparing the comparison value with a predefined threshold value. In this way, both the state prior to the crimping and the state after the crimping are considered when assessing the tightness of the closure 12. Furthermore, this allows for destruction-free checking.

Figure 7:
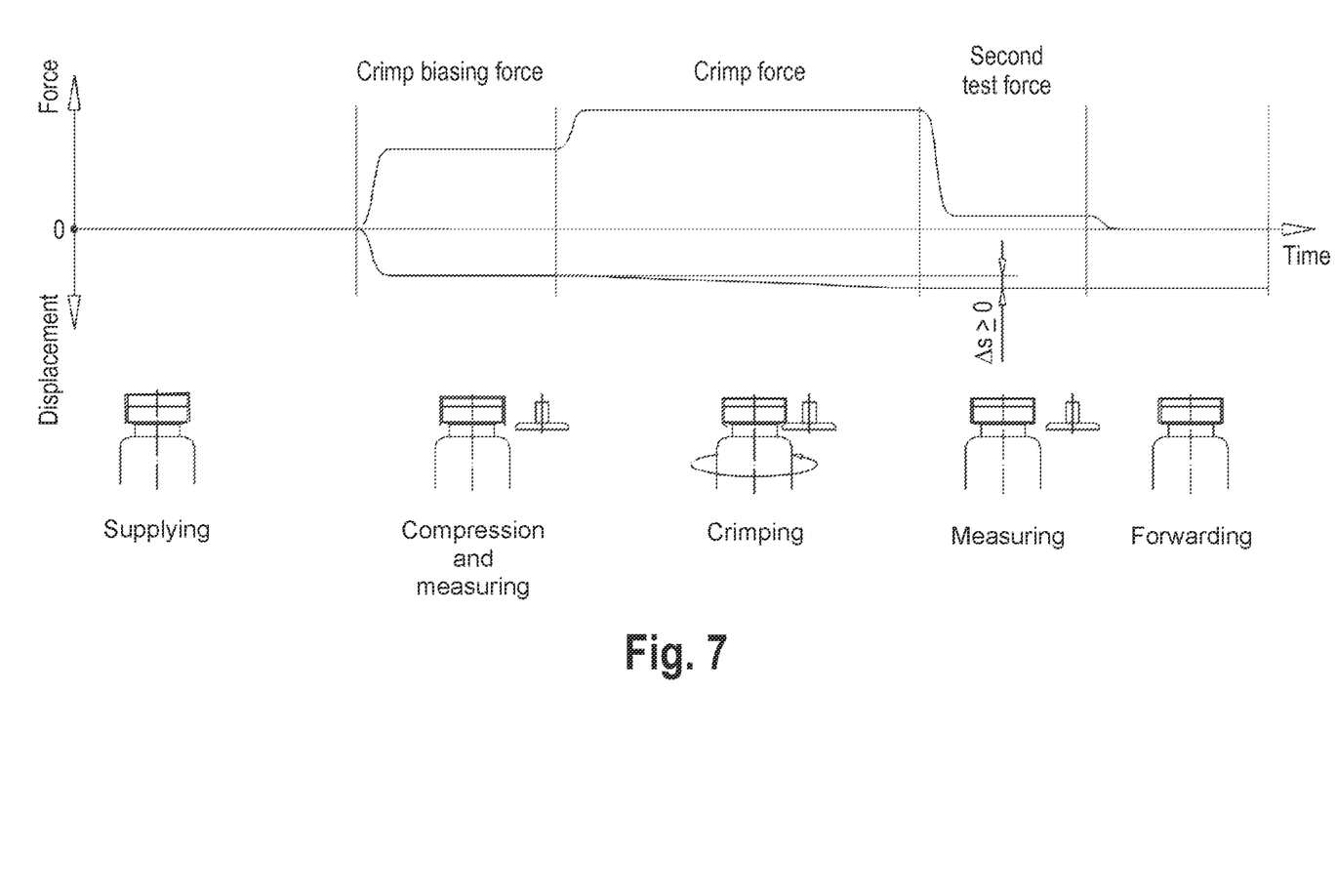

FIG. 7 shows a force-displacement diagram according to an embodiment of a method 100. The force-displacement diagram shown in FIG. 7 differs from the force-displacement diagram shown in FIG. 6 in that, to assess the tightness of the closure 12, a comparison value is determined on the basis of a stroke position value corresponding to the second test force and a stroke position value corresponding to the crimp biasing force. The assessment of the tightness of the closure 12 is assessed by comparing the comparison value with a predefined threshold value. This embodiment also allows destruction-free checking of the closure 12, but does not consider the state prior to crimping.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for checking the tightness of a closure of a container, the closure comprising a closure cap for closing the container and an elastic sealing member arranged between the closure cap and a mouth edge of the container, wherein the method comprises the following steps:
    exerting a first test force on the elastic sealing member to effect compression of the elastic sealing member;
    measuring a first end position value indicating a stroke position of the elastic sealing member resulting from the first test force;
    exerting a crimp biasing force on the elastic sealing member, thereby pressing the elastic sealing member against the mouth edge of the container, and crimping the closure cap;
    exerting a second test force on the elastic sealing member biased by the crimped closure cap; and
    measuring a second end position value indicating a stroke position of the biased elastic sealing member resulting from the second test force;
    determining a comparison value based on the first end position value and the second end position value; and
    assessing the tightness of the closure by comparing the comparison value to a predefined threshold value.

2. The method as claimed in claim 1, wherein the first test force is equal to the second test force, or wherein the first test force is equal to the crimp biasing force.

3. The method as claimed in claim 1, wherein the crimp biasing force is greater than the second test force.

4. The method as claimed in claim 1, wherein a transition between the exerting the first test force, the exerting the crimp biasing force, and the exerting the second test force each occurs continuously without completely releasing the corresponding compressive force on the elastic sealing member.

5. The method as claimed in claim 4, wherein between the exerting the first test force and the exerting the second test force, stroke positions of the elastic sealing member are continuously recorded and stored.

6. The method as claimed in claim 1, wherein the determined comparison value is a difference between the first end position value and the second end position value.

7. The method as claimed in claim 1, wherein the determined comparison value is a quotient between the first end position value and the second end position value.

8. The method as claimed in claim 6, wherein, if the determined comparison value deviates from the predefined threshold value representing a proper closure, the closure to be checked is classified as improper.

9. The method as claimed in claim 8, wherein the predefined threshold value comprises a tolerance band of predefined end position differences or predefined end position quotients of proper closures, wherein the closure to be checked is classified as proper if the determined comparison value is within the tolerance band.

10. The method as claimed in claim 8, wherein, for assessing the tightness of the closure, in addition to the step of comparing the determined comparison value with the predefined threshold value, the second end position value which indicates the stroke position of the biased elastic sealing member resulting from the second test force is compared with a predefined end position value of a proper closure, wherein the predefined end position value of the proper closure indicates a stroke position of an elastic sealing member of the proper closure subjected to the second test force.

11. The method as claimed in claim 8, wherein, for assessing the tightness of the closure, in addition to the step of comparing the determined comparison value with the predefined threshold value, the first end position value which indicates the stroke position of the elastic sealing member resulting from the first test force is compared with a predefined end position value of a proper closure, wherein the predefined end position value of the proper closure indicates a stroke position of an elastic sealing member of the proper closure subjected to the first test force.

12. The method as claimed in claim 1, wherein at least one of the steps of measuring the first end position value resulting from the first test force or measuring the second end position value resulting from the second test force is performed on the basis of an optical distance measurement and/or a magnetic length measurement.

13. The method as claimed in claim 1, wherein the exerting the first test force and the exerting the second test force are each actuated by a drive unit, wherein at least one of the steps of measuring the first end position value or measuring the second end position value is performed on the basis of a position detection in the drive unit.

14. An apparatus for checking the tightness of a closure of a container, the closure comprising a closure cap for closing the container and an elastic sealing member arranged between the closure cap and a mouth edge of the container, comprising:
    a turntable movable relatively against the closure of the container for exerting a compressive force on the elastic sealing member to effect compression of the elastic sealing member, wherein the turntable is connected to an axially displaceable drive shaft of a drive unit, and wherein the turntable is configured to be set in rotation with the container coupled thereto;
    a crimping device for crimping the closure cap;
    a control unit for controlling the drive unit; and
    a position encoder for providing a value representing a stroke position of the turntable,
    wherein the apparatus is further configured to perform the following steps:
        exerting, by way of the drive unit, a first test force on the elastic sealing member to effect compression of the elastic sealing member;
        measuring, by way of the position encoder, a first end position value indicating a stroke position of the elastic sealing member resulting from the first test force;
        exerting, by way of the drive unit, a crimp biasing force on the elastic sealing member, thereby pressing the elastic sealing member against the mouth edge of the container, and crimping the closure cap;
        exerting, by way of the drive unit, a second test force on the elastic sealing member biased by the crimped closure cap; and
        measuring, by way of the position encoder, a second end position value indicating a stroke position of the biased elastic sealing member resulting from the second test force;
        determining, by way of a comparison unit, a comparison value based on the first end position value and the second end position value; and assessing, by way of the comparison unit, the tightness of the closure by comparing the comparison value to a predefined threshold value.

15. The apparatus as claimed in claim 14, wherein the drive shaft of the drive unit is configured to be rotatable.

16. The apparatus as claimed in claim 14, wherein the drive unit is a linear-rotary motor.

17. The apparatus as claimed in claim 14, wherein the position encoder is a motor sensor configured to determine the value representing the stroke position of the turntable.

18. The apparatus as claimed in claim 14, wherein the position encoder is an optical sensor configured to optically determine the value representing the stroke position of the turntable.

19. The apparatus as claimed in claim 14, wherein the position encoder is a motor sensor configured to determine the value representing the stroke position of the turntable, and in that the apparatus comprises a further position encoder, wherein the further position encoder is an optical reflection sensor configured to optically determine the value representing the stroke position of the turntable.

20. The apparatus as claimed in claim 14, wherein the crimping device comprises at least one fixing means movable transversely to a longitudinal axis of the container, which is movable between a position in which the fixing means is pressed against the closure cap to plastically deform a free end of the closure cap and a position in which it is spaced from the closure cap.

21. The apparatus as claimed in claim 20, wherein the control unit is further configured to bring the fixing means into abutment with the crimp closure cap while the container is set in rotation.

* * * * *